HIGH FREQUENCY COMMUNICATION SYSTEM
Filed March 26, 1952
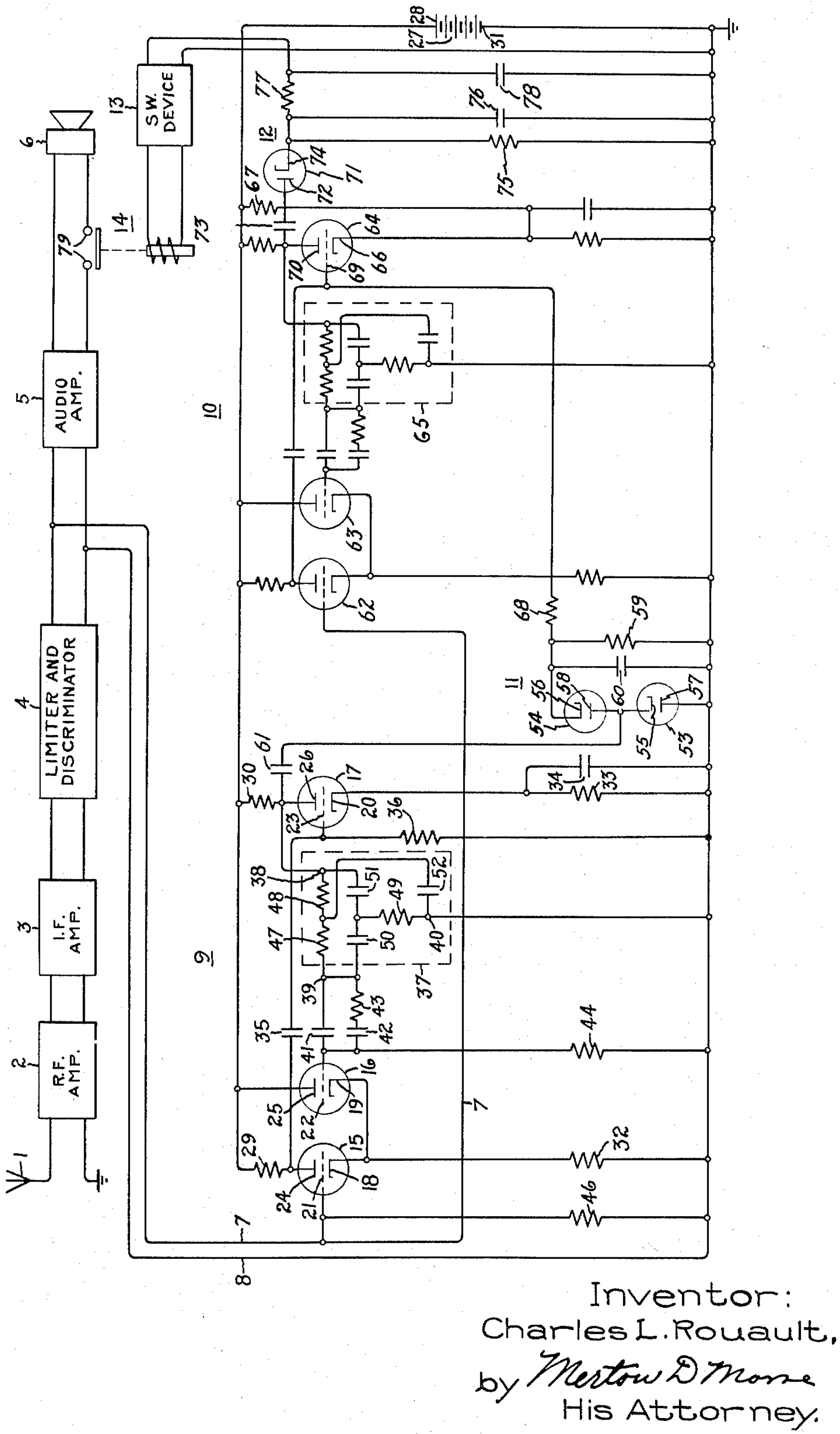
Inventor:
Charles L. Rouault,
by Merton D. Morse
His Attorney.

United States Patent Office 2,724,049

Patented Nov. 15, 1955

2,724,049

HIGH FREQUENCY COMMUNICATION SYSTEM

Charles L. Rouault, Syracuse, N. Y., assignor to General Electric Company, a corporation of New York Application March 26, 1952, Serial No. 278,678

3 Claims. (Cl. 250—2)

The present invention relates to high frequency communication systems and particularly to such systems in which means are employed to select a particular high frequency receiver to the exclusion of other receivers in the system.

An object of my invention is to provide improved means for effecting, from a transmitting station, the selection of a receiver with which that station is to communicate.

A further object of my invention is to provide means in each of the receiving stations in the system, all of which may operate on the same carrier frequency, to render the respective receiving station operative only in response to reception of a pair of waves of different frequencies to which only the respective receiving station responds. These waves may be received as modulation of the carrier wave first by one wave and then by the other for an instant prior to the desired communication.

In carrying this invention into effect there is provided in each of the receiving stations means for developing a voltage whenever the first of said waves is being received, and another means responsive to this voltage and to the second wave of said waves to render the low frequency portion of the receiver operative, such means being of a character as to maintain it operative after said waves terminate. Means are provided for rendering the low frequency portion inoperative on termination of communication with the receiving station. In one form of the invention to be described, such means include a pair of selective amplifiers to the input of which said waves are applied. One amplifier is tuned to pass the first wave and the other amplifier is tuned to pass the second wave. The second amplifier is normally inoperative until voltage is received from the first amplifier to render it operative to pass the second wave which is utilized to render the low frequency portion of the receiver operative.

The novel features which are believed to be characteristic of this invention are set forth with particularity in the appended claims. The invention itself, however, both as to its organization and method of operation, together with further objects and advantages thereof may best be understood by reference to the following description taken in connection with the accompanying drawing showing an embodiment of this invention as applied to a frequency modulation receiver.

The receiver comprises an antenna 1, a radio frequency amplifier 2, an intermediate frequency amplifier 3, a limiter and discriminator 4, an audio frequency amplifier 5 and a loudspeaker 6 connected together in that order.

The aforementioned waves are received at the output of the discriminator 4 and are applied over conductors 7 and 8 to the input of the selective amplifiers 9 and 10, respectively. Selective amplifier 9 is tuned to pass the first wave and reject other waves. Selective amplifier 10 is tuned to pass the second wave and reject others. Selective amplifier 10 is further interconnected with selective amplifier 9 through rectifier means 11. The latter means renders selective amplifier 10, which is normally inoperative, operative for a predetermined time interval after the passage of the aforementioned first wave through the first amplifier. Thus the second wave having the frequency to which the second selective amplifier 10 is tuned and occurring within the predetermined interval after termination of the first wave is passed by the selective amplifier 10. A second rectifier means 12 connected to the output of the second selective amplifier rectifies the second wave. The rectified wave is applied to the switching device 13 to activate the relay 14, and thus, to render the audio channel of the aforementioned receiver operative.

Selective amplifier 9 comprises electron discharge devices 15, 16 and 17 including respective cathodes 18, 19, 20, respective grids 21, 22, 23, and respective anodes 24, 25, 26. These devices are supplied with unidirectional operating potential from source 27 having a positive terminal 28 connected to the anode 25 directly and to anodes 24 and 26 through resistances 29 and 30, respectively and having a negative terminal 31 connected to cathodes 18 and 19 through resistance 32, and to cathode 20 through resistance 33 bypassed by bypass capacitor 34.

Electron discharge devices 15 and 16 function as an amplifier. Waves appearing across the resistance 29 are applied to electron discharge amplifier 17 through a coupling capacitor 35 connected between anode 24 and grid 23. Grid leak resistance 36 is connected between grid 23 and ground.

The output from amplifier 17 is applied in degenerative phase to amplifier 15, 16 through filter network 37 having an input terminal 38, an output terminal 39 and a common terminal 40. The anode 26 of electron discharge amplifier 17 is connected to input terminal 38. Common input and output terminal 40 is connected to ground. The output terminal 39 of network 37 is connected through capacitor 41 shunted by series combination of capacitor 42 and resistance 43 to grid 22 of electron discharge device 16. Grid 22 is connected to ground through grid leak resistance 44, and grid 21 is connected to ground through grid leak resistance 46.

Network 37 comprises resistances 47, 48 and 49, and capacitances 50, 51 and 52. Resistances 47 and 48 are connected in series between input and output terminals 38 and 39, respectively, and capacitor 52 is connected between the junction of these resistances and the common terminal 40. Capacitors 50 and 51 are connected in series between the input terminal and output terminals 38 and 39, respectively, and the junction of these capacitances is connected to ground through resistance 49. When the resistances and capacitances of the network are proportioned so that:

resistance 47 = resistance 48
capacitance 50 = capacitance 51
capacitance 52 = twice capacitance 50
resistance 49 = one-half resistance 47 the transmission characteristic of the network is such that at the center frequency determined by the relationship:

$$\text{center frequency} = \frac{1}{2\pi \times \text{resistance } 47 \times \text{capacitance } 50}$$

voltage waves applied between the input terminals 38, 40 are not transmitted to the output terminals 39, 40. However, at frequencies on either side of the center frequency, the transmission of waves increases with increase in departure from the center frequency. Thus, the feedback through the network 37 from amplifier 17 to amplifier 15, 16 is zero at the center frequency of the network and is degenerative at frequencies both above and below the center frequency. Accordingly, the discharge devices 15, 16 and 17 amplify the center frequency considerably more than frequencies on either side of the center frequency and thus the amplifier selectively passes the frequency to which the network is tuned.

The network comprising capacitors 41, 42 and resistances 43 is known as an "anti-thumping" network and functions to prevent self-oscillation of the amplifier at frequencies below the frequency of operation of the selective amplifier and particularly at frequencies of the order of a few as for example, three cycles per second.

Output appearing across anode load resistance 30 is rectified by a voltage doubler 11 comprising unilaterally conducting devices 53, 54 having respective cathodes 55, 56 and respective anodes 57, 58. Anode 57 is connected to ground; the cathode 55 is connected to anode 58; and cathode 56 is connected to anode 52 through resistance 59 shunted by capacitor 60. The anode 26 of device 17 is coupled to the junction of elements 53 and 54 through coupling capacitor 61. The unidirectional output appearing across capacitor 60 is applied to selective amplifier 10, which is normally biased to be inoperative, to render the latter operative for a sufficient time to pass waves having a frequency to which it is tuned. The time during which the selective amplifier 10 is rendered operative is determined by the values of resistance 59 and capacitance 60.

Selective amplifier 10 includes electron discharge devices 62, 63 and 64 having their discharge paths energized from the source of operating potential 27. Selective amplifier 10 is substantially identical to selective amplifier 9 except that the network 65 corresponding to network 37 of amplifier 9 is tuned to pass a different frequency and that device 64 corresponding to device 17 of selective amplifier 9 is maintained nonconductive until rendered conductive by a voltage obtained from rectifier 11. The device 64 is maintained nonconductive by a positive bias voltage applied to cathode 66 of device 64 through resistance 67 connected between the cathode 65 and positive terminal 28 of source 27. This positive bias voltage is overcome by the voltage applied from rectifier 11 through resistance 68 connected between cathode 56 of rectifier 11 and grid 69 of device 64.

The output appearing at anode 70 of device 64 is applied to rectifier 12, including a unilaterally conducting device 71 having an anode 72 connected through coupling capacitor 73 to anode 70 and a cathode 74 connected through resistance 75 shunted by capacitor 76 to ground. The voltage appearing across capacitor 76 is integrated by means of integration network comprising resistance 77 and capacitance 78 connected in series between cathode 74 and ground.

The voltage appearing across capacitance 78 is applied to switching device 13 to render the relay 14 operative to close the contacts 79 thereof, thereby connecting the loudspeaker 6 to the audio amplifier 5. Switching device 13 may be any device which develops an energizing voltage in response to a momentary impulse of predetermined amplitude. It may for example include various gaseous discharge device circuits.

After termination of communication with the receiver, the loudspeaker 6 may be disconnected from the audio amplifier by interrupting the current flow to the relay 14, thereby readying the receiver for another communication which may be directed to it.

As pointed out above, the selective calling signal comprises a carrier wave modulated momentarily first by one wave having one frequency and after a short interval by another wave having another frequency. In actual operation it has been found satisfactory to make the duration of the first wave about 0.3 of a second and to make the duration of the second wave about 0.2 of a second, the latter wave beginning about 10 milliseconds after termination of the first wave. To call a particular receiver, the frequency of the first wave is selected to be the frequency to which selective amplifier 9 is tuned and the frequency of the second wave is selected to be the frequency to which the selective amplifier 10 is tuned. The selective amplifier 9 passes the first wave which is then rectified by the voltage doubler 11. The rectified voltage is applied to selective amplifier 10 to render the latter operative to pass the second wave. It has been found satisfactory to arrange the time constant of the resistor 59 and capacitor 60 combination to maintain selective amplifier 10 operative for about one second. The output from the selective amplifier 10 is rectified, integrated by resistance 77 and capacitance 78, and then applied to switching device 13 to activate the audio channel of the receiver. The integrating network 77, 78 relays the buildup of voltage applied to device 13 to actuate the latter. With this provision the possibility of spurious waves actuating the device 13 is minimized.

While I have shown a particular embodiment of my invention, it will, of course, be understood that I do not wish to be limited thereto since many modifications both in the circuit arrangement and in the instrumentalities employed may be made, and I therefore contemplate by the appended claims to cover any such modifications that come within the true spirit and scope of my invention.

What I claim as new and desire to secure by Letters Patent of the United States is:

1. The combination, in a high frequency receiver having a normally inoperative low frequency portion, and a normally operative high frequency portion carrying a high frequency wave modulated in sequence by two low frequency waves, a selective filter means adapted to pass only the first of said low frequency waves, another filter means adapted to pass only the second of said low frequency waves, said other filter means being normally inoperative to pass the second of said waves, means for applying said modulated waves to each of said filter means, means connected to the output of said one filter means and responsive to the first of said low frequency waves for deriving a voltage corresponding to the presence thereof, means for applying said voltage to said second filter means after the cessation of the first of said low frequency waves for rendering said other filter means operative to pass the second of said low frequency waves, means responsive to the second of said low frequency waves for rendering said low frequency portion operative.

2. The combination, in a high frequency receiver having a normally inoperative low frequency portion and a normally operative high frequency portion carrying a high frequency wave modulated in sequence by two low frequency waves, a selective filter means adapted to pass only the first of said low frequency waves, another selective filter means adapted to pass only the second of said waves, said other filter means being normally inoperative to pass the second of said waves, means for applying said modulated waves to each of said filter means, means connected to the output of said one filter means and responsive to the first of said low frequency waves for deriving a voltage corresponding to the presence thereof, means for applying said voltage to said second filter means after the cessation of the first of said low frequency waves for rendering said other filter means operative to pass the second of said low frequency waves, means for rectifying the output of said other filter means, means for integrating said rectified waves, and means responsive to said integrated output for rendering said low frequency portion operative.

3. The combination, in a high frequency receiver having a normally inoperative low frequency portion, and a normally operative high frequency portion carrying a high frequency wave modulated in sequence by two low frequency waves, a selective amplifier adapted to pass only the first of said low frequency waves, another selective amplifier adapted to pass only the second of said low frequency waves, said other amplifier being biased to block the passage of waves therethrough, means for applying said modulated waves to each of said selective amplifiers, means for rectifying the output of said one amplifier and applying said rectified output to said other amplifier after the cessation of the output from said one amplifier to unbias said other amplifier to render said other amplifier operative to pass the second of said low frequency waves, means responsive to the second of said low frequency waves for rendering said low frequency portion operative.

References Cited in the file of this patent

UNITED STATES PATENTS

| | | |
|---|---|---|
| 2,523,315 | Mayle | Sept. 26, 1950 |
| 2,547,025 | Noble | Apr. 3, 1951 |
| 2,591,937 | Herrick | Apr. 8, 1952 |
| 2,630,525 | Tomberlin | Mar. 3, 1953 |